Figure 1:
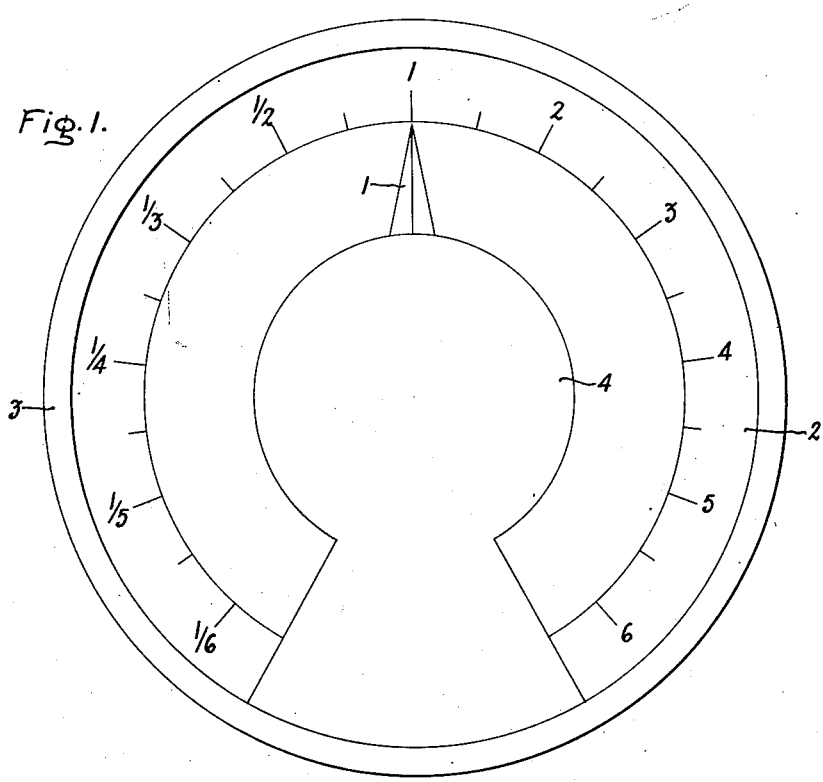

July 2, 1957 — D. R. SWAN — 2,798,200
LONG-SCALE RATIO INSTRUMENT
Filed April 3, 1953 — 3 Sheets-Sheet 1

Inventor:
Dean R. Swan,
by Richard E. Hooley
His Attorney.

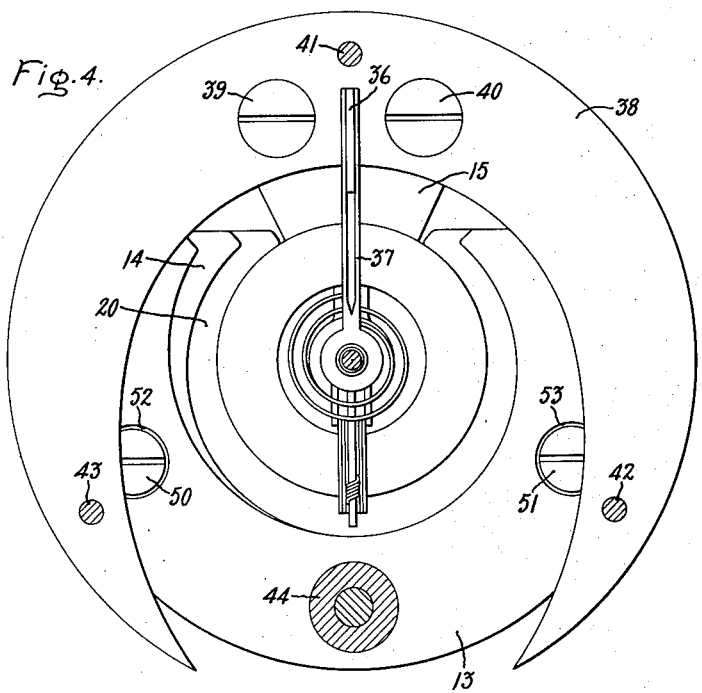
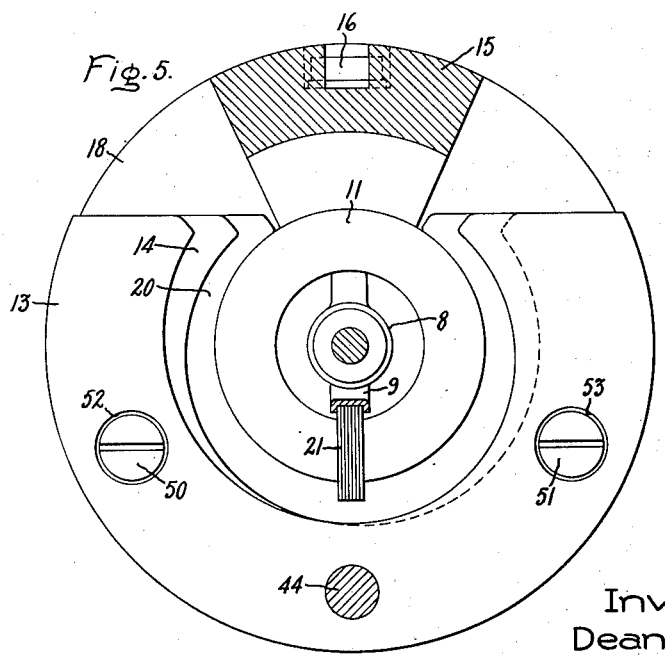

July 2, 1957 D. R. SWAN 2,798,200
LONG-SCALE RATIO INSTRUMENT
Filed April 3, 1953 3 Sheets-Sheet 3
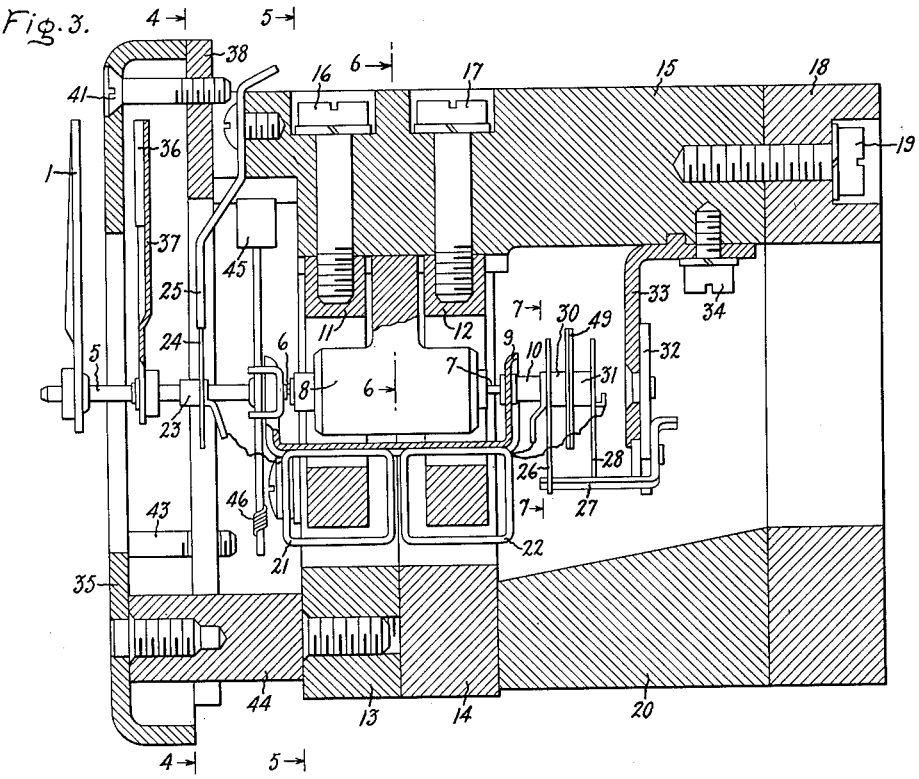
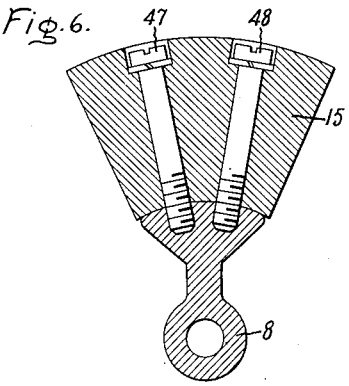
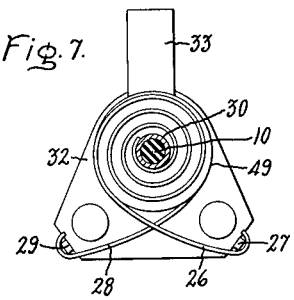
Inventor:
Dean R. Swan,
by Richard E. Hosley
His Attorney.

United States Patent Office 2,798,200
Patented July 2, 1957

2,798,200

LONG-SCALE RATIO INSTRUMENT

Dean R. Swan, Nahant, Mass., assignor to General Electric Company, a corporation of New York Application April 3, 1953, Serial No. 346,616

4 Claims. (Cl. 324—140)

My invention relates to improvements in electrical instruments, and in particular to an improved long-scale instrument for measuring the ratio between two electric currents.

In one type of long-scale ratio instrument, two spiral pole faces are arranged substantially concentric with two annular cores, and separated therefrom by two air gaps. A permanent magnet provides magnetic flux across the two gaps. The two pole faces spiral outward in opposite directions, so that one of the two gaps increases in width and the other of the two gaps decreases in width along its length in the clockwise direction around the annular cores. The magnetic flux densities in the gaps vary inversely with the gap widths.

Two coils, movable in unison, are respectively positioned in the two gaps. Each coil carries one of the measured currents, and tends to move along its gap in the direction of decreasing flux density. In consequence, the coils move toward the position in which the ratio of the flux densities is inversely proportional to the ratio of the currents. This position, which is a measure of the current ratio, is indicated by a conventional scale and pointer.

Two difficulties are encountered in this construction. One difficulty is that small variations of dimensions occurring in the manufacture of the parts may cause variations in the scale distribution from one instrument to another, so that good accuracy cannot be obtained using standard scales and economical manufacturing tolerances. The other difficulty arises from the common use of spiral springs as a means for making electrical connections with the movable coils. Such springs exert a torque which tends to move the coils to a predetermined neutral position, usually the mid-scale position. For other coil positions, the spring torque produces an error in the indicated ratio value, the magnitude of which depends upon both the current ratio and the magnitude of the currents. Consequently, if the instrument is calibrated for one current magnitude, its ratio indications may be substantially in error for other current magnitudes.

The chief object of my invention is to provide an improved ratio instrument in which the aforementioned difficulties are overcome. Other objects and advantages will appear as the description proceeds.

Briefly stated, in accordance with one aspect of my invention, the positions of the pole faces are made adjustable relative to the annular cores, as hereinafter explained, so that the flux distribution in the gaps can be changed by a simple adjustment to provide a predetermined scale distribution. The spring torque is balanced by a magnetic compensator to be described.

My invention will be better understood from the following description taken in connection with the accompanying drawings, and its scope will be pointed out in the appended claims. In the drawings, Fig. 1 is a front view of an improved long-scale ratio instrument embodying principles of my invention, Fig. 2 is a similar view of the same instrument, with the cover, scale, and case removed, Fig. 3 is a section taken generally along the line 3—3 of Fig. 2, Fig. 4 is a section taken generally along the line 4—4 of Fig. 3, Fig. 5 is a section taken generally along the line 5—5 of Fig. 3, Fig. 6 is a detail section taken generally along the line 6—6 of Fig. 3, and Fig. 7 is another detail taken generally along the line 7—7 of Fig. 3.

Referring now to Fig. 1 of the drawing, the instrument comprises a movable pointer 1 cooperating with a fixed scale 2 suitably calibrated in current ratio values. The cover 3 may include a glass face in the conventional manner, and may also include a mask 4 for improved appearance. A conventional instrument case, not shown, may be attached to the back side of the cover to enclose the instrument.

Figure 2:
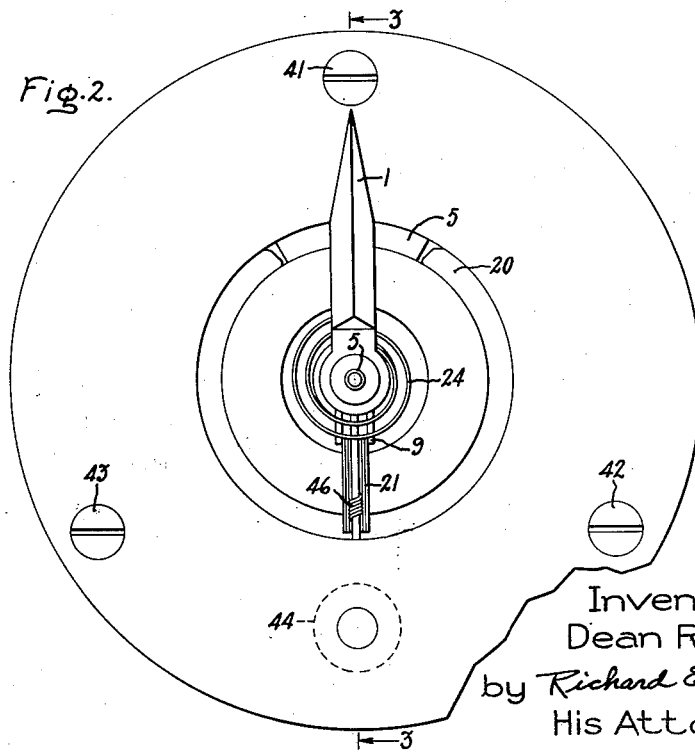

Figs. 2 and 3 show the instrument with the cover, scale, and case removed. Pointer 1 is attached to a shaft 5 which is a part of a rotatable structure pivoted at 6 and 7 in conventional jewel bearings supported by the bearing mount 8. The rotatable structure includes a channeled U-shaped member 9 attached at one end to shaft 5 and at its other end to a shaft 10.

Coaxial with the axis of the rotatable structure, and with each other, there are two annular ferro-magnetic core members 11 and 12. As is best shown in Figs. 3 and 5, two pole face members 13 and 14 are respectively positioned substantially concentric with the core members 11 and 12, and separated therefrom by a pair of air gaps. The pole faces, along the inner circumferences of members 13 and 14, are spiral in shape, as best shown in Fig. 5, and spiral outward in opposite directions, so that one of the air gaps increases in width, and the other air gap decreases in width along its length in the clockwise direction around the core members 11 and 12. That is to say, the pole face members 13—14 comprise a pair of tapered annular members and are so arranged that the two parts are tapered in opposite directions.

The core members 11 and 12 are attached to a steel yoke 15, by screws 16 and 17 for example, which in turn is attached to a soft iron ring 18, by suitable means such as screw 19. A C-shaped permanent magnet 20 is transversely magnetized to provide, for example, a north pole at its left-hand end and a south pole at its right-hand end as seen in Fig. 3. A magnetic circuit exists from the north pole of magnet 20 through the soft iron pole pieces 14 and 13, across the two air gaps to core members 11 and 12, through steel yoke 15 and through soft iron ring 18 to the south pole of magnet 20, thus providing magnetic flux across the two air gaps. Since the reluctance of the magnetic circuit is chiefly in the air gaps, the magnetic flux density at any point in the gaps is inversely proportional to the width of the gap at that point.

Two coils, 21 and 22 respectively, are attached to member 9 of the rotatable structure, as shown. It will be noted that a portion of coil 21 is located in the air gap between pole face member 13 and core member 11, and that a portion of coil 22 is located in the air gap between pole face member 14 and core member 12. As the rotatable structure is turned, coils 21 and 22 move in unison along the length of the air gaps. A common electrical connection to coils 21 and 22 is completed through a collar 23, attached to shaft 5, and a spiral spring 24 having its inner end soldered to collar 23 and its outer end soldered to a tab 25. Another electrical connection to coil 21 is completed through a spiral spring 26 and a terminal 27, while the second electrical connection to coil 22 is completed through a spiral spring 28 and a terminal 29. The spiral springs 26 and 28 are best shown in Figs. 3 and 7.

Referring to Figs. 3 and 7, the inner ends of spiral springs 26 and 28 are attached to collars 30 and 31, respectively, which are attached in turn to an insulator portion of shaft 10. The terminals 27 and 29 are attached to an insulator member 32 supported by a bracket 33 attached to steel yoke 15 by screw 34. It will be noted that springs 26 and 28 are shown as being opposed to provide torques in opposite directions. Alternatively, the springs 26 and 28 may be wound in the same direction, and their torques opposed by that of spring 24. In either case, the net torque of the three springs is zero when pointer 1 is at its mid-scale position. However, when the pointer is rotated away from its mid-scale position, there is a small net spring torque which tends to return the pointer to the mid-scale position. This net spring torque is balanced by an opposing torque provided by a magnetic compensator hereinafter described.

Two direct currents which are to be compared are passed through coils 21 and 22 respectively. The interaction of the current through the coils and the magnetic flux across the air gaps tends to move each coil toward a region of smaller flux density; that is, tends to move coil 21 counterclockwise and to move coil 22 clockwise. The opposing torques provided by the two coils are equal when the coils are at a position where the ratio of the flux densities across the two gaps is inversely proportional to the ratio of the currents. The coil torques therefore tend to turn the rotatable structure to this position, whereupon pointer 1 indicates on scale 2 the ratio of the two currents.

The scale distribution of the instrument depends critically upon the flux distribution across the air gaps. In manufacturing a large number of instruments, it is desirable that all of the instruments conform to a predetermined scale distribution, so that a standard printed scale may be used. However, when employing economical manufacturing tolerances, small variations in the shape and size of the parts will occur, and instruments so manufactured will not normally have identical scale distributions. To overcome this difficulty, a simple calibration adjustment is provided, as will now be described.

The pole face members 13 and 14 are held in position by screws 50 and 51, best shown in Fig. 5, which pass through transverse holes in the pole face members. The heads of screws 50 and 51 fit into recesses 52 and 53, as shown. When screws 50 and 51 are tightened, the screw heads engage the bottoms of recesses 52 and 53, thereby holding the pole piece members securely in place. The transverse holes in the pole face members are made slightly oversize relative to screws 50 and 51, so that when the screws are loosened the positions of the pole face members can be adjusted slightly relative to the annular core members 11 and 12. Preferably, the pole piece members 13 and 14 can be adjusted either independently or together.

Referring to Fig. 5, assume that both pole face members are moved slightly toward the right. At the left-hand end of the two air gaps, this movement decreases the width of both gaps by equal amounts, but proportionately the decrease in width of the smaller gap is greater than the decrease in width of the larger gap, so that the ratio of the two fluxes is increased. Therefore, this portion of the scale is made to represent a larger current ratio. The same adjustment causes the opposite end of the scale to represent a smaller ratio. Consequently, by moving the two pole face pieces slightly, either to the left or to the right, the current ratios at the two ends of the scale can be made equal.

Now assume that both pole face members are moved slightly upward, as seen in Fig. 5. This reduces the flux density ratio at both ends of the scale, and thus changes the current ratios represented by the respective scale ends in the same direction. In this way, the two end points of the scale can be adjusted to the predetermined calibration values. Adjustment of the center, or mid-scale, point can be effected by moving one pole face member slightly up or down relative to the other. In this way, calibration adjustments can be made for three widely separated points on the scale, which assures that the instrument will match the predetermined scale distribution with good accuracy, despite small variations occurring in the manufacture of the parts.

Alternatively, instead of moving pole face members 13 and 14 for calibration purposes, the core members 11 and 12 can be moved relative to the pole faces by first loosening screw 19. The results are substantially the same in either case.

The magnetic compensator which balances the net spring torque is best shown in Figs. 3 and 4. A soft iron ring 35 is parallel to the pole face member 13, and is separated therefrom by an air gap having its plane perpendicular to the axis of rotation of the rotatable structure comprising shaft 5. Movable within this air gap is a ferromagnetic member, which may consist of a small steel rod 36 supported by a non-magnetic arm 37 attached to shaft 5. As shaft 5 rotates, steel rod 36 moves circumferentially about the air gap.

Ring 35 is connected to the south pole of magnet 20 through yoke 15 and ring 18, and pole face member 13 is connected to the north pole of magnet 20 through member 14. Consequently, magnet 20 provides magnetic flux across the air gap between members 13 and 35. The steel rod 36 is partially shielded from this magnetic flux by a crescent-shaped shielding member 38, best shown in Fig. 4. It may be noted that member 38 is so shaped that maximum shielding is provided when member 36 is at a position corresponding to the mid-scale ratio indication. This is the neutral position at which the net torque provided by springs 26 and 28 is zero. As shaft 5 is turned to move rod 36 away from the mid-scale position, the amount of shielding provided by member 38 decreases so that member 36 moves into a region of greater flux density.

Since ferromagnetic members in magnetic fields tend to move toward regions of greater flux density, rod 36 provides a torque which tends to rotate the rotatable structure away from the mid-scale position. On the other hand, springs 26 and 28 provide a net torque which tends to rotate the structure toward the mid-scale position. Shielding member 38 is so shaped that these opposed torques are always substantially equal, whereby the spring torque is neutralized. This permits the coils 21 and 22 to move exactly to the position at which the ratio of flux densities acting upon the coils is inversely proportional to the ratio of currents through the coils, so that the instrument correctly indicates current ratios irrespective of current magnitudes.

Shielding member 38 is preferably attached to steel yoke 15 by two screws, 39 and 40, as shown in Fig. 4. Ring 35 is then attached to shielding member 38, and thus to yoke 15, by three screws 41, 42, and 43, best shown in Fig. 2. Additional support, for greater mechanical strength, may be provided by a non-magnetic post 44 connecting ring 35 with pole face member 13, as best shown in Fig. 3. Post 44 may be made of brass, or other suitable non-magnetic material.

It will be noted that ring 35 and shielding member 38 are both attached to steel yoke 15, so that both have the same magnetic polarity. Thus there is substantially no magnetic flux between ring 35 and shielding member 38.

A small brass cylinder 45 is attached to the rotatable structure as best shown in Fig. 3. It may be noted that pointer 1, ferromagnetic element 36, and cylinder 45 are on one side of the axis of rotation, while coils 21 and 22 are on the other side of the axis of rotation, so that the rotatable structure is substantially balanced. Precise balance is obtained by means of the small balancing weight 46.

Fig. 6 shows the manner in which bearing mount 8 is attached to steel yoke 15. The bearing mount is held in place by two screws 47 and 48.

The insulating washer 49, best shown in Figs. 3 and 7, separates the collars 30 and 31. Washer 49 also serves the purpose of keeping the connecting lead to collar 31 away from the springs 26 and 28.

To facilitate assembly, core members 11 and 12 may be provided with radial slots, preferably made just large enough for coils 21 and 22 to pass through the slots, in the conventional manner. After the coils are in place, these slots may be closed by the insertion of removable sections.

It will be understood that my invention is not limited to the specific embodiment herein illustrated and described, and that the following claims are intended to cover all changes and modifications which do not depart from the true spirit and scope of the invention.

What I claim as new and desire to secure by Letters Patent of the United States is:

1. A ratio instrument comprising first and second annular core members, first and second pole face members respectively positioned substantially concentric with said core member and separated therefrom by first and second air gaps, first and second coils movable in unison in said first and second gaps respectively, a plurality of opposed spiral springs supplying torques tending to rotate said coils to a mid-scale angular position, a ring parallel to said first pole face member and separated therefrom by a third air gap, said third gap extending in a direction parallel to the axis of said core members, a ferromagnetic element within said third gap and movable with said coils, means providing magnetic flux across said three gaps, and a crescent-shaped shielding member partially shielding said element from said flux, said shielding member being so shaped and positioned that the amount of shielding provided is maximum when said coils are in said mid-scale position and progressively decreases as said coils are rotated away from said mid-scale position by amounts such that said ferromagnetic element provides a torque which opposes and balances the net spring torque.

2. A ratio instrument comprising first and second annular core members in axial alignment, first and second annular tapered pole face members respectively positioned substantially concentric with said core members and separated therefrom by first and second air gaps, one of said gaps progressively increasing in width and the other of said gaps progressively decreasing in width along its length in the clockwise direction around said core members, a structure rotatable about the axis of said core members, said structure including first and second coils movable in unison within and along the length of said first and second air gaps respectively upon rotation of said structure, at least one spring supplying torque tending to rotate said structure to a predetermined angular position, a ring parallel to said first pole face member and separated therefrom by a third air gap extending in a direction parallel to the axis of said core members, said structure including a ferromagnetic element rotatable therewith and thereby movable within said third gap, permanent magnet means providing magnetic flux across said three gaps, and a shielding member partially shielding said element from said flux, said shielding member being so shaped that the amount of shielding provided varies with changes in the angular position of said structure such that said element supplies a torque which opposes and balances the spring torque.

3. A ratio instrument comprising first and second annular core members, first and second pole face members respectively positioned substantially concentric with said core members and separated therefrom by first and second air gaps, first and second coils movable in unison in said first and second gaps respectively, a ring parallel to said first pole face member and separated therefrom by a third air gap, said third gap extending in a direction parallel to the axis of said core members, a ferromagnetic element within said third gap and movable with said coils, means providing magnetic flux across said three gaps, a crescent-shaped shielding member partially shielding said element from said flux, said pole face members having a plurality of transverse holes, and a plurality of screws respectively extending through said holes for holding said pole face members in position, said holes being oversize with respect to said screws so that when the screws are loosened the positions of said pole face members may be adjusted to adjust the magnetic flux distribution across said first and second gaps.

4. In a ratio instrument of the type having a coil structure located in a first air gap across which there is directed a magnetic field whereby said coil structure is rotatable about an axis, a plurality of opposed spiral springs supplying torques tending to rotate said structure to a mid-scale angular position, a pair of stationary annular members arranged coaxially with said coil structure, said members being separated by a second air gap extending in a direction parallel to said axis, means providing magnetic flux across said second gap, a ferromagnetic element rotatable with said structure and thereby movable within said second gap, and a crescent-shaped shielding member partially shielding said element from said flux, said shielding member being so shaped and positioned that the amount of shielding provided is maximum when said structure is in its mid-scale position and progressively decreases as said structure is rotated away from said position by amounts such that said element provides a torque which opposes and balances the net spring torque.

References Cited in the file of this patent

UNITED STATES PATENTS

| | | |
|---|---|---|
| 1,597,327 | Obermaier | Aug. 24, 1926 |
| 1,632,623 | Rich | June 14, 1927 |
| 1,918,023 | Faus | July 11, 1933 |
| 2,382,295 | Conrad | Aug. 14, 1945 |
| 2,382,315 | Hiller | Aug. 14, 1945 |
| 2,406,887 | McBride | Sept. 3, 1946 |
| 2,409,866 | Jewell | Oct. 22, 1946 |
| 2,425,366 | De Giers et al. | Aug. 12, 1947 |
| 2,428,209 | Fleming | Sept. 30, 1947 |

FOREIGN PATENTS

| | | |
|---|---|---|
| 281,605 | Germany | Jan. 15, 1915 |
| 891,979 | France | Dec. 17, 1943 |